United States Patent
Takagi et al.

(10) Patent No.: US 10,184,513 B2
(45) Date of Patent: Jan. 22, 2019

(54) THRUST SLIDING BEARING

(71) Applicant: TAIHO KOGYO Co., Ltd., Toyota-shi, Aichi (JP)

(72) Inventors: Shogo Takagi, Toyota (JP); Satoru Kanbara, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 0 days.

(21) Appl. No.: 15/556,888

(22) PCT Filed: Dec. 18, 2015

(86) PCT No.: PCT/JP2015/085447
§ 371 (c)(1),
(2) Date: Sep. 8, 2017

(87) PCT Pub. No.: WO2016/143225
PCT Pub. Date: Sep. 15, 2016

(65) Prior Publication Data
US 2018/0023619 A1 Jan. 25, 2018

(30) Foreign Application Priority Data

Mar. 10, 2015 (JP) ................. 2015-047438

(51) Int. Cl.
*F16C 17/04* (2006.01)
*F16C 33/20* (2006.01)
*F16C 9/02* (2006.01)
*F16C 33/10* (2006.01)
*F16C 33/12* (2006.01)

(52) U.S. Cl.
CPC .......... *F16C 17/04* (2013.01); *F16C 33/1065* (2013.01); *F16C 33/125* (2013.01);
(Continued)

(58) Field of Classification Search
CPC .. F16C 9/02; F16C 17/04; F16C 33/20; F16C 33/1075; F16C 33/122; F16C 33/206;
(Continued)

(56) References Cited

U.S. PATENT DOCUMENTS 6,149,310 A * 11/2000 Ono .................... F02F 7/0053
384/294
6,481,895 B2 * 11/2002 Yang .................... F16C 9/02
384/294
(Continued)

FOREIGN PATENT DOCUMENTS

JP 2013148136 A 8/2013
WO 2014091206 A1 6/2014

OTHER PUBLICATIONS

International Search Report for corresponding PCT/JP2015/085447; dated Mar. 15, 2016.

*Primary Examiner* — Marcus Charles
(74) *Attorney, Agent, or Firm* — Cantor Colburn LLP

(57) ABSTRACT

A thrust sliding bearing may include a thrust receiving surface comprising radial oil grooves, and a resin portion, the resin portion comprising a plurality of resin sheets in an area defined by the oil grooves of the thrust receiving surface, the plurality of resin sheets being laminated. Circumferential widths of the plurality of resin sheets may increase upwardly from a bottom resin sheet. A circumferential width of the resin portion may decrease upwardly.

4 Claims, 4 Drawing Sheets

(52) U.S. Cl.
CPC ............ *F16C 33/20* (2013.01); *F16C 33/206* (2013.01); *F16C 2208/20* (2013.01); *F16C 2208/82* (2013.01)

(58) Field of Classification Search
CPC .............. F16C 33/1065; F16C 2360/22; F16C 2226/72; F16C 33/046; F16C 33/125; F16C 2208/82; F16C 2208/20; F05C 2553/20
USPC ....... 384/123, 275–279, 288, 294, 305, 308, 384/112, 283, 291
See application file for complete search history.

(56) References Cited

U.S. PATENT DOCUMENTS

| | | | |
|---|---|---|---|
| 6,976,788 B2 * | 12/2005 | Honda | F16C 33/1065 384/123 |
| 7,134,793 B2 * | 11/2006 | Thompson | F16C 9/02 384/294 |
| 9,004,041 B2 * | 4/2015 | Bednarz | F16C 9/02 123/198 DA |
| 9,188,159 B2 * | 11/2015 | Tanaka | F16C 33/046 |
| 9,618,034 B2 | 4/2017 | Carter et al. | |
| 2002/0094143 A1 * | 7/2002 | Yang | F16C 9/02 384/294 |
| 2003/0128902 A1 * | 7/2003 | Kennedy | F16C 9/02 384/275 |
| 2006/0034556 A1 * | 2/2006 | Thompson | F16C 9/02 384/288 |
| 2008/0085068 A1 * | 4/2008 | Hemmi | F16C 17/04 384/105 |
| 2010/0215300 A1 * | 8/2010 | Schlabs | F16C 17/10 384/420 |
| 2012/0243815 A1 * | 9/2012 | Kuwabara | F16C 43/02 384/420 |
| 2015/0323001 A1 | 11/2015 | Carter et al. | |

* cited by examiner

THRUST SLIDING BEARING

CROSS REFERENCE TO RELATED APPLICATIONS

This is the U.S. national stage of application No. PCT/JP2015/85447, filed on Dec. 18, 2015. Priority under 35 U.S.C. § 119(a) and 35 U.S.C. § 365(b) is claimed from Japanese Application No. 2015-047438, filed on Mar. 10, 2015; the disclosure of which are incorporated herein by reference.

TECHNICAL FIELD

The present invention relates to a technique for a thrust sliding bearing.

BACKGROUND ART

A thrust sliding bearing is known as a bearing for supporting the thrust load of a rotating shaft. For example, Patent Document 1 discloses a thrust sliding bearing, where a thrust receiving surface is divided into a plurality of arc segments by radially formed oil grooves and generally U-shaped first projections are formed, each of the first projections projecting to a predetermined width and height along a periphery and being open toward a front oil groove.

In the thrust sliding bearing disclosed in Patent Document 1, however, the projection is U-shaped and its radial width is small, so that the oil film pressure cannot be increased and frictional resistance increases. The U-shaped projection also increases the contact area with a rotating shaft and frictional resistance increases.

PRIOR ART DOCUMENTS

Patent Documents

Patent Document 1: JP-A 2013-148136 Gazette

SUMMARY OF THE INVENTION

Problems to be Solved by the Invention

The present invention is directed to a thrust sliding bearing capable of reducing frictional resistance.

Solutions to the Problems

A thrust sliding bearing according to the present invention is a thrust sliding bearing for supporting a load applied in a thrust direction of a rotating shaft. A thrust sliding bearing for supporting a load applied in a thrust direction of a rotating shaft. A thrust receiving surface is provided with radial oil grooves, a resin portion is formed by laminating a plurality of resin sheets in an area defined by the oil grooves of the thrust receiving surface, circumferential widths of the plurality of resin sheets increase upwardly from a bottom resin sheet, and a circumferential width of the resin portion decreases upwardly.

In the thrust sliding bearing of the present invention, the resin portion is formed so as to be axisymmetric about a centerline passing through an approximate circumferential center of the area defined by the grooves.

In the thrust sliding bearing of the present invention, the resin portion includes a land portion; and tapered portions or stepped portions that are formed with the land portion interposed between the tapered portions or the stepped portions.

Effects of the Invention

The thrust sliding bearing of the present invention can reduce frictional resistance.

BRIEF DESCRIPTION OF THE DRAWINGS

FIG. 1B is a cross-section of FIG. 1A along the line 1B.

FIG. 2B is a cross-section of FIG. 2A along the line 2B.

FIG. 3B is a cross-section of FIG. 3A along the line 3B.

FIG. 4B is a cross-section of FIG. 4A along the line 4B.

EMBODIMENTS OF THE INVENTION

A structure of a crank washer 10 is described with reference to FIGS. 1A and 1B.

Figure 1A:
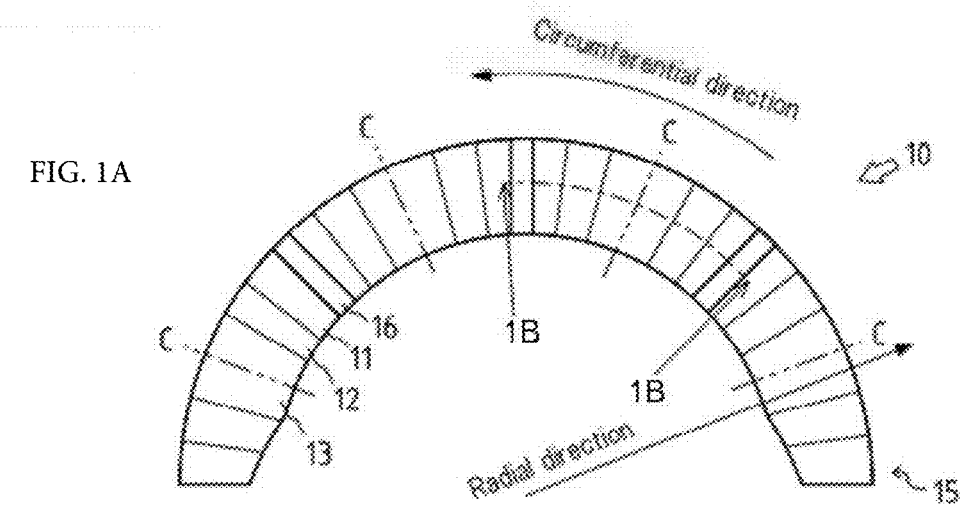
FIGS. 1A and 1B are schematic diagrams illustrating a structure of a crank washer according to a first embodiment.
Figure 1B:
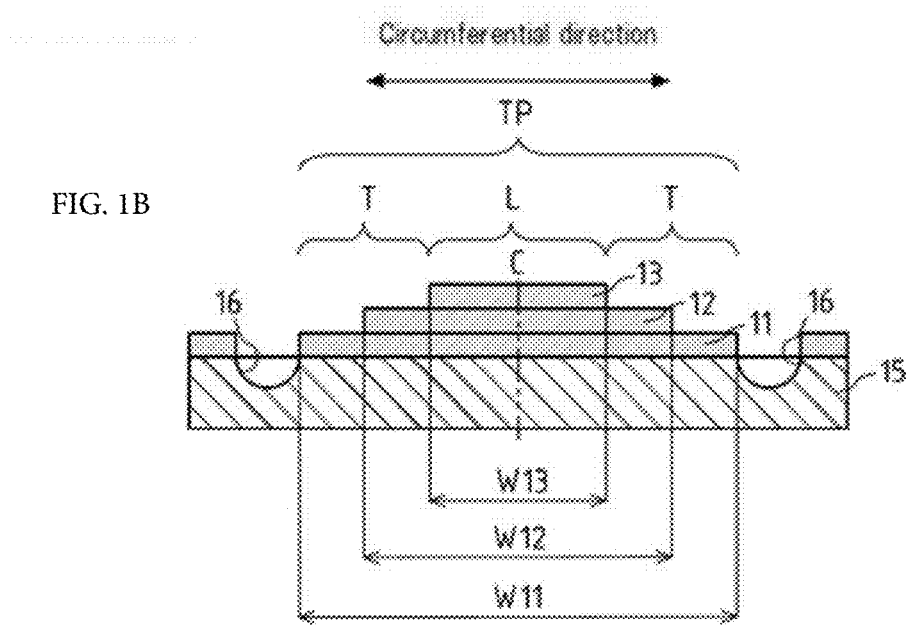

FIG. 1A is a plan view illustrating the structure of the crank washer 10. FIG. 1B is a cross-sectional view taken along line X1-X1 of FIG. 1A.

The crank washer 10 is a first embodiment of a thrust sliding bearing of the present invention. The crank washer 10 is a bearing that is disposed between a main shaft of a crankshaft and a housing and supports the thrust load of the crankshaft on the housing.

The crank washer 10 is formed by dividing a generally donut-shaped plate in half. The crank washer 10 is described below, referring to a circumferential direction and a radial direction with reference to a generally donut-shaped outer peripheral circle of the crank washer 10 (see FIG. 1A). The circumferential length in FIG. 1A is referred to as a width from a macroscopic point of view.

The crank washer 10, whose body 15 is provided with oil grooves 16, is formed by laminating a first resin sheet 11 as a resin, a second resin sheet 12 as a resin, and a third resin sheet 13 as a resin.

The body 15 is formed by dividing a generally donut-shaped plate in half. A thrust receiving surface (i.e., a side on which the crankshaft is supported) of the body 15 is provided with a plurality of oil grooves 16. The oil grooves 16 are formed radially from the center of the outer peripheral circle toward the outer peripheral circle. In other words, the oil grooves 16 are formed in the radial direction of the outer peripheral circle. The crank washer 10 of the present embodiment is provided with three oil grooves 16.

Herein, an area defined by the oil grooves 16 of the body 15 and an area defined by a circumferential end of the body 15 and the oil groove 16 are referred to as tapered land areas TP.

The first resin sheet 11 is laminated to (i.e., coated on) the tapered land area TP of the body 15. The first resin sheet 11 is formed by circumferentially dividing a generally donut-shaped sheet substantially the same as the body 15 into first widths W11. The first width W11 is substantially the same as the width of the tapered land area TP.

The second resin sheet 12 is laminated to (i.e., coated on) the first resin sheet 11. The second resin sheet 12 is formed by circumferentially dividing a generally donut-shaped sheet substantially the same as the body 15 into second widths W12. The second width W12 is set to be less than the first width W11.

The third resin sheet 13 is laminated to (i.e., coated on) the second resin sheet 12. The third resin sheet 13 is formed by circumferentially dividing a generally donut-shaped sheet substantially the same as the body 15 into third widths W13. The third width W13 is set to be less than the second width W12.

That is, the first resin sheet 11, the second resin sheet 12, and the third resin sheet 13 are laminated so that the respective circumferential widths of the resin sheets decrease upwardly.

The first resin sheet 11, the second resin sheet 12, and the third resin sheet 13 are laminated so that they are axisymmetric about a centerline C passing through the approximate circumferential center of the tapered land area TP of the body 15.

In other words, the first resin sheet 11, the second resin sheet 12, and the third resin sheet 13 are laminated with their centerlines passing through the respective approximate circumferential centers of the resin sheets 11, 12, 13 aligned with the centerline C of the tapered land area TP.

In the present embodiment, the first resin sheet 11, the second resin sheet 12, and the third resin sheet 13 are each formed of a resin sheet of the same material.

Such a structure provides a stepped profile that is circumferentially formed from the third resin sheet 13 to the oil groove 16 by an end of the third resin sheet 13, an end of the second resin sheet 12, and an end of the first resin sheet 11.

The stepped profile formed by the end of the third resin sheet 13, the end of the second resin sheet 12, and the end of the first resin sheet 11 is seen as a tapered shape from a macroscopic point of view (hereinafter referred to as a tapered portion T). A thrust receiving side of the third resin sheet 13 is referred to as a land portion L.

While the stepped profile formed by the end of the third resin sheet 13, the end of the second resin sheet 12, and the end of the first resin sheet 11 is seen as a tapered shape from a macroscopic point of view in the present embodiment, the stepped profile may be formed as a tapered shape by adjusting viscosity and/or preparing ingredients of the resin.

The operation of the crank washer 10 will be described.

As described above, the main shaft of the crankshaft slides (i.e., rotates) on the thrust receiving side of the crank washer 10 through lubricant.

The wedging action of the tapered portion T increases the oil film pressure of the lubricant in the higher RPM range of the crankshaft (i.e., engine), thus reducing the frictional resistance between the crank washer 10 and the crankshaft. The term "wedging action" refers herein to a phenomenon in which the lubricant is drawn in the direction in which a gap decreases, pressure is generated in the oil film, and the generated oil film pressure supports a load applied to the shaft.

Only the third resin sheet 13 (i.e., land portion L) comes in contact with the crankshaft through the lubricant in the lower RPM range of the crankshaft (i.e., engine), so that low frictional force is achieved by a resin containing solid lubricant and the frictional resistance between the crank washer 10 and the crankshaft is reduced.

The effect of the crank washer 10 is described.

The crank washer 10 can reduce frictional resistance.

That is, in use of the crank washer 10, the frictional resistance is reduced by achieving low frictional force using the third resin sheet 13 in the lower RPM range and by the wedging action of the tapered portion T in the higher RPM range, and the frictional resistance can be reduced in the entire RPM range.

The crank washer 10, in which the first resin sheet 11, the second resin sheet 12, and the third resin sheet 13 are laminated so that they are axisymmetric about the centerline C, provides a similar wedging action even if the crankshaft rotates in either direction with respect to the thrust receiving surface. Therefore, common parts may be used without identifying a crank washer 10 to be assembled according to the rotational direction.

A structure of a crank washer 20 is described with reference to FIGS. 2A and 2B.

Figure 2A:
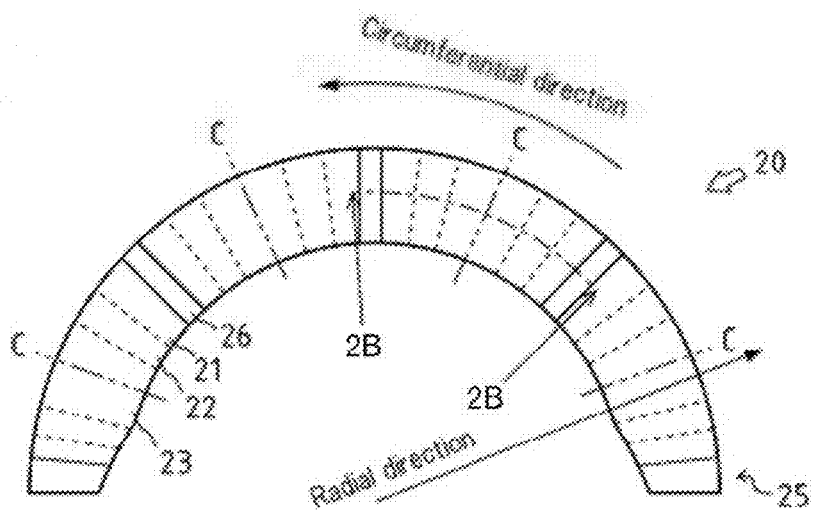
FIGS. 2A and 2B are schematic diagrams illustrating a structure of a crank washer according to a second embodiment.
Figure 2B:
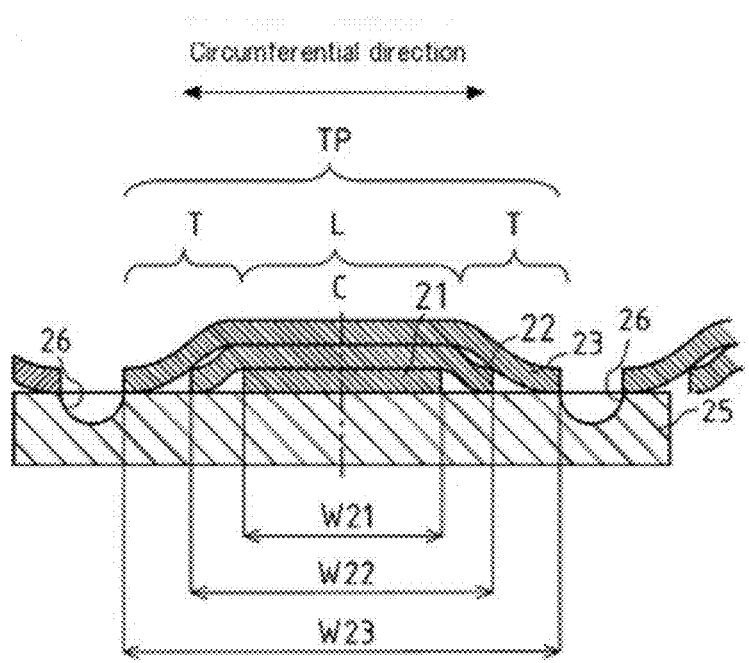

FIG. 2A is a plan view illustrating the structure of the crank washer 20. FIG. 2B is a cross-sectional view taken along line X2-X2 of FIG. 2A. Additionally, the circumferential and radial directions in FIG. 2A are similar to those in FIG. 1A.

The crank washer 20 is a second embodiment of a thrust sliding bearing of the present invention. The crank washer 20, whose body 25 is provided with oil grooves 26, is formed by laminating a first resin sheet 21 as a resin, a second resin sheet 22 as a resin, and a third resin sheet 23 as a resin.

The body 25, the oil groove 26, and a tapered land area TP are formed similarly to the body 15 and the oil groove 16 of the first embodiment, and thus the description thereof is not repeated here.

The first resin sheet 21 is laminated to the tapered land area TP of the body 25. The first resin sheet 21 is formed by circumferentially dividing a generally donut-shaped sheet substantially the same as the body 25 into first widths W21. The first width W21 is set to be sufficiently smaller than the width of the tapered land area TP.

The second resin sheet 22 is laminated to the first resin sheet 21. The second resin sheet 22 is formed by circumferentially dividing a generally donut-shaped sheet substantially the same as the body 25 into second widths W22. The second width W22 is set to be greater than the first width W21.

The third resin sheet 23 is laminated to the second resin sheet 22. The third resin sheet 23 is formed by circumferentially dividing a generally donut-shaped sheet substantially the same as the body 25 into third widths W23. The third width W23 is set to be greater than the second width W22. The third width W23 is substantially the same as the width of the tapered land area TP.

That is, the first resin sheet 21, the second resin sheet 22, and the third resin sheet 23 are laminated so that the respective circumferential widths of the resin sheets increase upwardly.

The first resin sheet 21, the second resin sheet 22, and the third resin sheet 23 are laminated so that they are axisymmetric about a centerline C passing through the approximate circumferential center of the tapered land area TP of the body 25.

In other words, the first resin sheet 21, the second resin sheet 22, and the third resin sheet 23 are laminated with their centerlines passing through the respective approximate circumferential centers of the resin sheets 21, 22, 23 aligned with the centerline C of the tapered land area TP.

Such a structure provides a tapered shape (hereinafter referred to as a tapered portion T) that is circumferentially formed from the third resin sheet 23 to the oil groove 26 by the third resin sheet 23 sloped by an end of the second resin sheet 22 and an end of the first resin sheet 21. A flat thrust receiving side of the third resin sheet 13 is referred to as a land portion L.

The advantageous effects of the crank washer 20 are similar to those of the crank washer 10 of the first embodiment, and thus the description thereof is not repeated here.

A structure of a crank washer 30 is described with reference to FIGS. 3A and 3B.

Figure 3A:
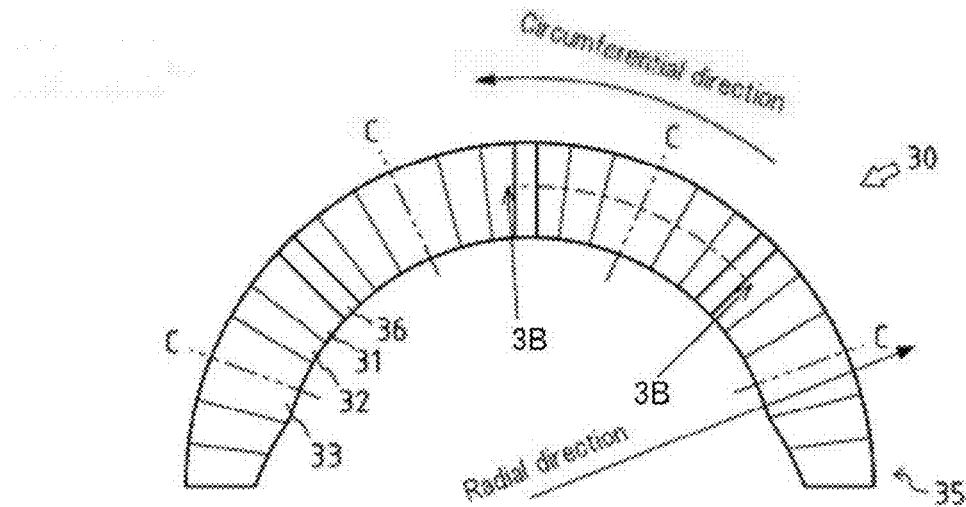
FIGS. 3A and 3B are schematic diagrams illustrating a structure of a crank washer according to a third embodiment.
Figure 3B:
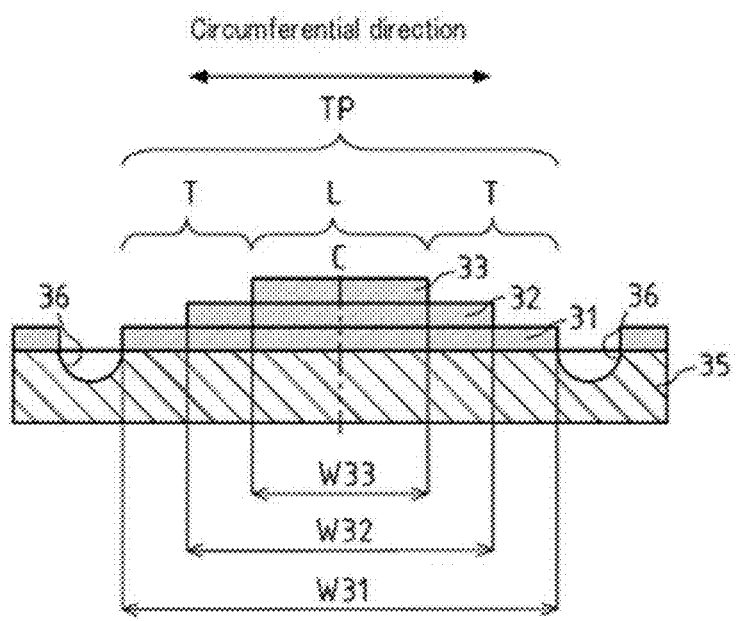

FIG. 3A is a plan view illustrating the structure of the crank washer 30. FIG. 3B is a cross-sectional view taken along line X3-X3 of FIG. 3A. Additionally, the circumferential and radial directions in FIG. 3A are similar to those in FIG. 1A.

The crank washer 30 is a third embodiment of a thrust sliding bearing of the present invention. The crank washer 30, whose body 35 is provided with oil grooves 36, is formed by laminating a first resin sheet 31, a second resin sheet 32, and a third resin sheet 33.

The body 35, the oil groove 36, the first resin sheet 31, the second resin sheet 32, and the third resin sheet 33 are formed similarly to the body 15, the oil groove 16, the first resin sheet 11, the second resin sheet 12, and the third resin sheet 13 of the first embodiment, respectively, and thus the description thereof is not repeated here.

The third resin sheet 33 is different from the first resin sheet 31 and the second resin sheet 32 in resin material.

Specifically, the third resin sheet 33 includes a resin sheet having low rigidity and high wear resistance as compared to the first resin sheet 31 and the second resin sheet 32. On the other hand, the first resin sheet 31 and the second resin sheet 32 include a resin sheet having high rigidity and low wear resistance as compared to the third resin sheet 33.

The advantageous effects of the crank washer 30 are generally similar to those of the crank washer 10 of the first embodiment, and thus the description of the advantageous effects similar to those of the crank washer 10 of the first embodiment is not repeated here.

A specific effect of the crank washer 30 of the present embodiment will be described.

The crank washer 30, in which the third resin sheet 33 includes a resin sheet having low rigidity and high wear resistance, can further reduce frictional resistance in the lower RPM range and further improve the durability of the resin sheet.

A structure of a crank washer 40 is described with reference to FIGS. 4A and 4B.

Figure 4A:
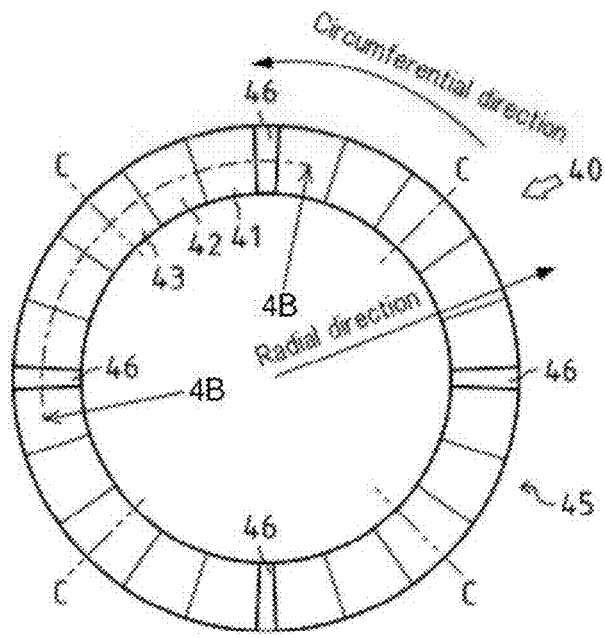
FIGS. 4A and 4B are schematic diagrams illustrating a structure of a crank washer according to a fourth embodiment.
Figure 4B:
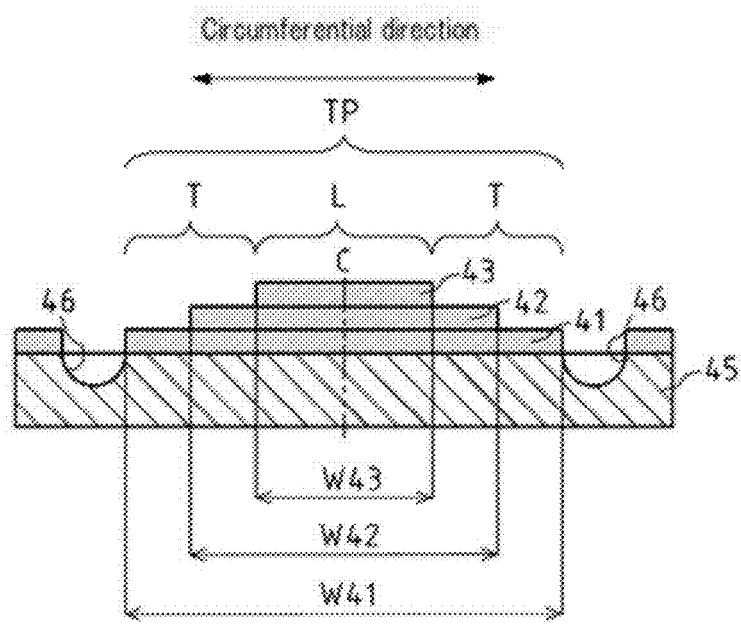

FIG. 4A is a plan view illustrating the structure of the crank washer 40. FIG. 4B is a cross-sectional view taken along line X4-X4 of FIG. 4A. Additionally, the circumferential and radial directions in FIG. 4A are similar to those in FIG. 1A.

The crank washer 40 is a fourth embodiment of a thrust sliding bearing of the present invention. The crank washer 40 has a structure similar to that of the crank washer 10 of the first embodiment except that the crank washer 40 is generally donut-shaped, and thus the description thereof is not repeated here.

The advantageous effects of the crank washer 40 are similar to those of the crank washer 10 of the first embodiment, and thus the description thereof is not repeated here.

While the thrust sliding bearing of the present invention has been applied to the crank washer 10 in the present embodiments, the present invention is not limited thereto. For example, even when the thrust sliding bearing of the present invention is applied to a pinion gear washer, similar advantageous effects can be achieved.

Note that the resins of the present embodiments (i.e., the first to fourth embodiments) include a combination of one of resins such as polyamide (PA), polyphenylene sulfide (PPS), polyamide imide (PAI), polyimide (PI), polytetrafluoroethylene (PTFE), polybenzimidazole (PBI), polyethylene (PE), polyetheretherketone (PEEK), epoxy resin, phenolic resin, and silicone resin; and one of solid lubricants such as molybdenum disulfide (MoS2), tungsten disulfide (WS2), graphite, hexagonal boron nitride, synthetic mica, and polytetrafluoroethylene (PTFE).

The resins of the present embodiments (i.e., the first to fourth embodiments) may be supplemented with hard particles, such as Al2O3, AlN, SiO2, CrO2, Si3N4, SiC, or ZrO2, to improve wear resistance; and with soft metal, such as Sn, Pb, Bi, Zn, Ag, Cu or In, to improve conformability.

While the present embodiments (i.e., the first to fourth embodiments) have a structure formed by laminating resin sheets, the embodiments are not limited thereto. For example, a structure may be formed by laminating or stacking resins using pad printing.

INDUSTRIAL APPLICABILITY

The present invention is applicable to a thrust sliding bearing.

DESCRIPTION OF REFERENCE SIGNS

10: Crank washer
11: First resin sheet
12: Second resin sheet
13: Third resin sheet
15: Body
16: Oil groove

The invention claimed is:

1. A thrust sliding bearing for supporting a load applied in a thrust direction of a rotating shaft, the thrust sliding bearing comprising:
   a thrust receiving surface comprising radial oil grooves, and
   a resin portion, the resin portion comprising a plurality of resin sheets in an area defined by the oil grooves of the thrust receiving surface, the plurality of resin sheets being laminated,
   wherein circumferential widths of the plurality of resin sheets increase upwardly from a bottom resin sheet, and
   a circumferential width of the resin portion decreases upwardly.

2. The thrust sliding bearing according to claim 1, wherein the resin portion is formed so as to be axisymmetric about a centerline passing through an approximate circumferential center of the area defined by the grooves.

3. The thrust sliding bearing according to claim 1, wherein the resin portion includes a land portion; and tapered portions or stepped portions that are formed with the land portion interposed between the tapered portions or the stepped portions.

4. The thrust sliding bearing according to claim 2, wherein the resin portion includes a land portion; and tapered portions or stepped portions that are formed with the land portion interposed between the tapered portions or the stepped portions.

\* \* \* \* \*